US012564960B2

(12) United States Patent
Song et al.

(10) Patent No.: US 12,564,960 B2
(45) Date of Patent: Mar. 3, 2026

(54) METHOD AND SYSTEM FOR PATH PLANNING OF ROBOT ARM IN DYNAMIC ENVIRONMENT

(71) Applicant: National Yang Ming Chiao Tung University, Hsinchu (TW)

(72) Inventors: Kai-Tai Song, New Taipei (TW); Chuan-Che Lee, New Taipei (TW)

(73) Assignee: National Yang Ming Chiao Tung University, Hsinchu (TW)

( * ) Notice: Subject to any disclaimer, the term of this patent is extended or adjusted under 35 U.S.C. 154(b) by 271 days.

(21) Appl. No.: 18/214,100

(22) Filed: Jun. 26, 2023

(65) Prior Publication Data

US 2024/0316773 A1 Sep. 26, 2024

(30) Foreign Application Priority Data

Mar. 20, 2023 (TW) ................................. 112110275

(51) Int. Cl.
*B25J 9/16* (2006.01)
(52) U.S. Cl.
CPC ........... *B25J 9/1666* (2013.01); *B25J 9/1697* (2013.01)
(58) Field of Classification Search
CPC ....... B25J 9/1666; B25J 9/1697; B25J 9/1676
See application file for complete search history.

(56) References Cited

U.S. PATENT DOCUMENTS 11,148,293 B2    10/2021  Song et al.
2011/0106306 A1*  5/2011  Kim ....................... B25J 9/1664
                                                             901/1

2015/0045954 A1*  2/2015  Negishi .................. B25J 9/1607
                                                             700/262
2019/0344445 A1*  11/2019  Song ...................... B25J 9/1697
2020/0377085 A1    12/2020  Floyd-Jones et al.
2021/0178591 A1*   6/2021  Floyd-Jones .......... B25J 9/1671
2021/0370510 A1*  12/2021  Mao ...................... B25J 13/086

FOREIGN PATENT DOCUMENTS

CN    103439972       12/2013
CN    112000099 A  * 11/2020   ........... G05D 1/0214
CN    112949366 A  *  6/2021   ......... G06K 9/00805
CN    113110505 A  *  7/2021   ........... G05D 1/0221
CN    114237302 A      3/2022

(Continued)

OTHER PUBLICATIONS

Zhongqiang Ren et al., "Multi-Objective Safe-Interval Path Planning With Dynamic Obstacles," IEEE Robotics and Automation Letters, vol. 7, No. 3, Jul. 2022.

(Continued)

*Primary Examiner* — Nhi Q Bui

(74) *Attorney, Agent, or Firm* — CKC & Partners Co., LLC

(57) ABSTRACT

A method for path planning of a robot arm in a dynamic environment includes steps as follows. During an operation of the robot arm in a three-dimensional environment, a state of an obstacle is obtained in real time, and when a collision danger occurs, the robot arm is allowed to dodge the obstacle. In the collision danger, a partial path of the robot arm is re-planned based on a hybrid RRT, so that the robot arm avoids dynamic and static obstacles in an environment and then returns to an original path for continuing operation.

14 Claims, 8 Drawing Sheets

100

(56)             References Cited

FOREIGN PATENT DOCUMENTS

| | | |
|---|---|---|
| CN | 115107021 A | 9/2022 |
| TW | I579669 | 4/2017 |
| TW | 201801965 | 1/2018 |
| TW | I769747 | 7/2022 |

OTHER PUBLICATIONS

Inyoung Ko et al., "VF-RRT: Introducing Optimization into Randomized Motion Planning," 2013 9th Asian Control Conference (ASCC), 2013.

Dave Ferguson et al., "Replanning with RRTs," Proceedings of the 2006 IEEE International Conference on Robotics and Automation, 2006.

Zhaochu, He et al. "Obstacle Avoidance Path Planning for Robot Arm Based on Mixed Algorithm of Artificial Potential Field Method and RRT." Industrial Engineering Journal 20 (2017): 56.

* cited by examiner

100

500

During an operation of the robot arm in a three-dimensional environment, a state of an obstacle is obtained in real time, and when a collision danger occurs, the robot arm is allowed to dodge the obstacle.

S510

In the collision danger, a partial path of the robot arm is re-planed based on the hybrid RRT

S520

METHOD AND SYSTEM FOR PATH PLANNING OF ROBOT ARM IN DYNAMIC ENVIRONMENT

RELATED APPLICATIONS

This application claims priority to Taiwan Application Serial Number 112110275, filed Mar. 20, 2023, which is herein incorporated by reference.

BACKGROUND

Field of Invention

The present disclosure relates to a robot system and an operation method thereof. More particularly, the present disclosure relates to a method and a system for path planning of a robot arm in a dynamic environment.

Description of Related Art

There are dynamically moving personnel and static machines and equipment in a factory environment. Currently, there is a collision avoidance path planning method designed for static or dynamic obstacles, however, there are still many drawbacks. In addition to that, there is currently no collision avoidance path planning designed to dodge static and dynamic obstacles at the same time.

When a robot arm is dodging dynamic obstacles, it cannot collide with static obstacles because it only deals with the dodging of dynamic obstacles. Since the obstacles for collision avoidance are static and dynamic obstacles, the efficiency of the collision avoidance path is one of the performances that need to be considered. The collision avoidance path should not be too long, which causes the robot arm to spend excessive time in dodging obstacles. Collision avoidance planning in all directions needs to be able to plan the collision avoidance path in all directions in real time, and allow the robot arm to maintain a certain working efficiency when dodging obstacles to ensure its production capacity.

SUMMARY

The present disclosure provides a method and a system for path planning of a robot arm in a dynamic environment to improve the problems in the related art.

One embodiment of the present disclosure provides a method for path planning of a robot arm in a dynamic environment. The method includes the following steps: obtaining a state of an obstacle in real time during an operation of the robot arm in a three-dimensional environment, and allowing the robot arm to dodge the obstacle when a collision danger occurs; and re-planning a partial path of the robot arm based on a hybrid rapidly-exploration random tree (Hybrid RRT) in the collision danger.

In the foregoing, the obstacle includes a static obstacle. The step of obtaining the state of the obstacle in real time includes: using a static obstacle model and an environment point cloud to initially obtain a point cloud of the static obstacle, then using an iterative closest point (ICP) method to track and update the point cloud of the static obstacle, and when the point cloud of the static obstacle is covered, storing tracking data at the last moment through the ICP method to be used as the point cloud of the static obstacle.

In the foregoing, the obstacle includes a dynamic obstacle. The step of obtaining the state of the obstacle in real time includes: using a background segmentation method to obtain a dynamic obstacle point cloud, and clustering the dynamic obstacle point cloud to obtain a point cloud cluster of the dynamic obstacle closest to the robot arm, and then using a Kalman filter to stabilize tracking of the point cloud cluster of the dynamic obstacle to obtain a tracking result of the dynamic obstacle.

In the foregoing, the step of re-planning the partial path includes: establishing a protection area around the dynamic obstacle, calculating a relative distance between a static original path of the robot arm and the protection area, obtaining the partial path that needs to be re-planned and establishing a start point and an end point of the partial path.

In the foregoing, the step of re-planning the partial path of the robot arm based on the hybrid RRT includes: integrating an artificial potential field (APF) and a rapidly-exploration random tree (RRT) through the hybrid RRT to re-plan the partial path; and dynamically adjusting a weight of the APF and a weight of the RRT based on a volume distribution of the obstacle in the three-dimensional environment so as to optimize the partial path.

In the foregoing, the method further includes: using a relative distance between the obstacle and an end effector of the robot arm to determine whether the robot arm executes a static original path or the partial path to avoid collision with the obstacle in all directions.

In the foregoing, the method further includes: making an end effector of the robot arm have a smooth speed when passing through a node on a path, then calculating an axial speed of motion of the robot arm; limiting the axial speed of the robot arm when approaching a singular point to avoid the singular point, and using other free axes to compensate for a speed so that the robot arm is allowed to continue moving on the path.

One embodiment of the present disclosure provides a system for path planning of a robot arm in a dynamic environment. The system includes a depth camera and a processing device. The processing device is electrically connected to the depth camera and the robot arm. The depth camera obtains image data of the robot arm during an operation in a three-dimensional environment. The processing device obtains a state of an obstacle in real time based on the image data, and the processing device allows the robot arm to dodge the obstacle when a collision danger occurs, and the processing device re-plans a partial path of the robot arm based on a hybrid rapidly-exploration random tree (Hybrid RRT).

In the foregoing, the hybrid RRT integrates an artificial potential field (APF) and a rapidly-exploration random tree (RRT). The processing device dynamically adjusts a weight of the APF and a weight of the RRT based on a volume distribution of the obstacle in the three-dimensional environment so as to optimize the partial path.

In the foregoing, the robot arm has an end effector. The processing device uses a relative distance between the obstacle and the end effector of the robot arm to determine whether the robot arm executes a static original path or the partial path to avoid collision with the obstacle in all directions.

In summary, the technical solution of the present disclosure has obvious advantages and beneficial effects as compared with the related art. By using the method and system for path planning of the robot arm in the dynamic environment according to the present disclosure, the dangerous sections in the task path of the robot arm are rapidly identify, and a collision avoidance path in all directions to dodge the static and dynamic obstacles is re-planned by using the obstacle information. The problem that the collision avoidance path planning can only dodge the static obstacle or the dynamic obstacle is resolved.

In addition to that, when re-planning the path, the present disclosure will dynamically adjust the characteristics of collision avoidance path planning based on the distribution of the current environment obstacles, thus improving the speed of collision avoidance planning in all directions and optimizing the length of the collision avoidance path in all directions. As a result, the robot arm can not only dodge the obstacles more immediately, but also dodge the obstacles with a more optimal path, which improves the working efficiency of the robot arm. As compared with the collision avoidance path planning in the related art, it has better abilities for planning the speed and optimizing the path.

It is to be understood that both the foregoing general description and the following detailed description are by examples, and are intended to provide further explanation of the disclosure as claimed.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain the principles of the present disclosure.

DESCRIPTION OF THE EMBODIMENTS

Figure 1:
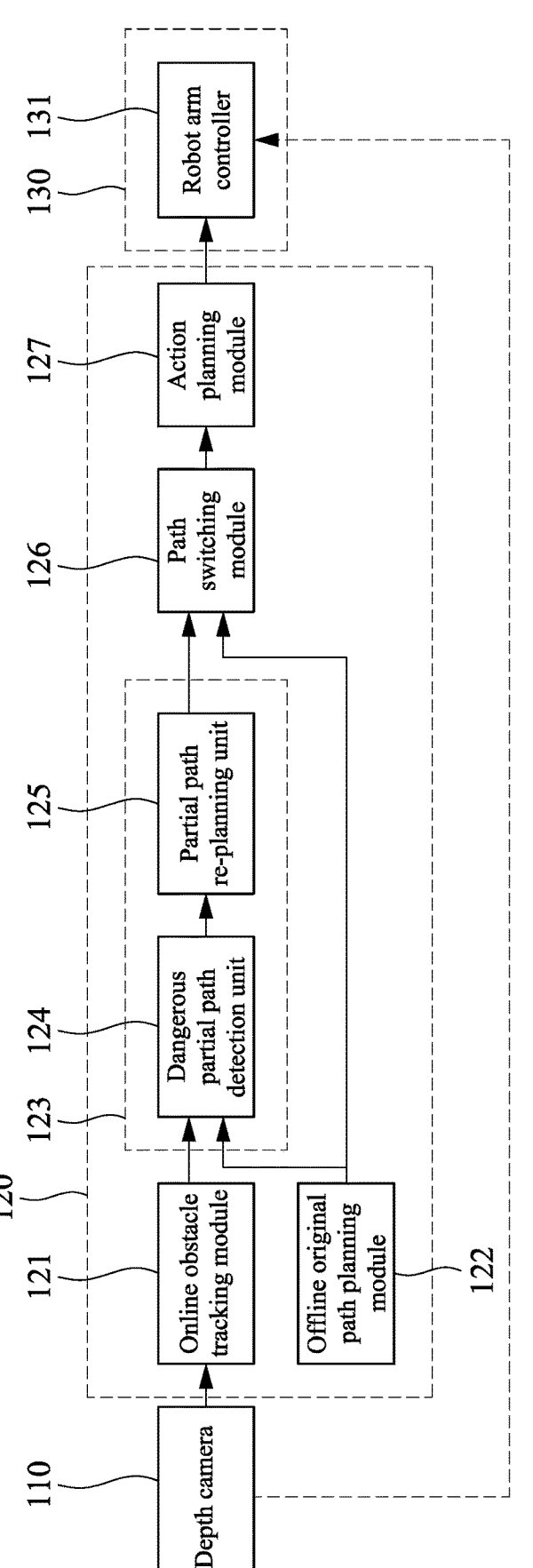
FIG. 1 depicts a structure diagram of a system for path planning of a robot arm in a dynamic environment according to one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts. In other instance, well-known components and steps are not described in detail in the embodiments to avoid unnecessarily limiting to the present disclosure.

A description is provided with reference to FIG. 1. The technical aspect of the present disclosure is a system 100 for path planning of a robot arm in a dynamic environment, which can be applied in automated factories, or widely used in related technical links. The system 100 for path planning of the robot arm in the dynamic environment of this technical aspect can achieve considerable technical progress, and has extensive industrial application value. A detailed implementation method of the system 100 for path planning of the robot arm in the dynamic environment is described as follows with reference to FIG. 1.

In some embodiments of the present disclosure, various embodiments of the system 100 for path planning of the robot arm in the dynamic environment are described with reference to FIG. 1. In the following description, for purposes of explanation, numerous specific details are further set forth in order to provide a comprehensive illustration of one or more embodiments. However, the present technology may be implemented without these specific details. In other instances, well-known structures and components are shown in block diagram form to effectively describe the embodiments. The term "for example" used herein means "serving as an example, instance, or illustration." Any embodiment described herein as an "example" need not be construed as preferred or superior to other embodiments.

FIG. 1 depicts a structure diagram of a system 100 for path planning of a robot arm in a dynamic environment according to one embodiment of the present disclosure. As shown in FIG. 1, the system 100 includes a depth camera 110 and a processing device 120. For example, the depth camera 110 may be a color depth camera. The processing device 120 may be a computer, an embedded system, or other computer equipment.

As for the structure, the processing device 120 is electrically connected to the depth camera 110 and a robot arm 130. It should be understood that, in the descriptions of the embodiments and the claims of the patent application, the description of "electrical connection" may refer to the indirect electrical coupling of one component to another component through other component(s), or the direct electrical connection of one component to another component without through other component(s). For example, the processing device 120 may be a built-in processing device directly electrically connected to the robot arm 130, or the processing device 120 may be an external processing device indirectly connected to the robot arm 130 through a circuit.

When being used, the depth camera 110 obtains image data during an operation of the robot arm 130 in a three-dimensional environment, and the processing device 120 obtains a state of an obstacle in real time based on the image data obtained by the depth camera 110. In addition, when a collision danger occurs, the processing device 120 allows the robot arm 130 to dodge the obstacle, and the processing device 120 re-plans a partial path of the robot arm 130 based on a hybrid rapidly-exploration random tree (Hybrid RRT).

As for the implementation method of the hybrid RRT, in one embodiment of the present disclosure, the hybrid RRT integrates an artificial potential field (APF) and an RRT. In each iterative search, the node newly added to the RRT is composed by adding the random vector generated by the RRT and the resultant force vector of the APF. In this manner, the RRT is affected by the resultant force of the APF in the three-dimensional environment, so that the extension of the RRT is guided by the APF to obtain the partial path.

Additionally, in some embodiments of the present disclosure, the processing device 120 dynamically adjusts a weight of the APF and a weight of the RRT based on a volume distribution of obstacles in the three-dimensional environment, thus optimizing the partial path. For example, in an area with more obstacles, the processing device 120 makes the weight of RRT increase, so that the search tree can have a higher degree of freedom to be out of this area. In an area with less obstacles, the processing device 120 makes the weight of APF increase, so that the search tree can be quickly converged by the APF to achieve the effect of accelerating path re-planning.

In order to further illustrate the structure of the above processing device 120, a description is provided with reference to FIG. 1. The processing device 120 includes an online obstacle tracking module 121, an offline original path planning module 122, a partial path re-planning module 123, a path switching module 126, and an action planning module 127. The partial path re-planning module 123 includes a dangerous partial path detection unit 124 and a partial path re-planning unit 125.

Figure 6:
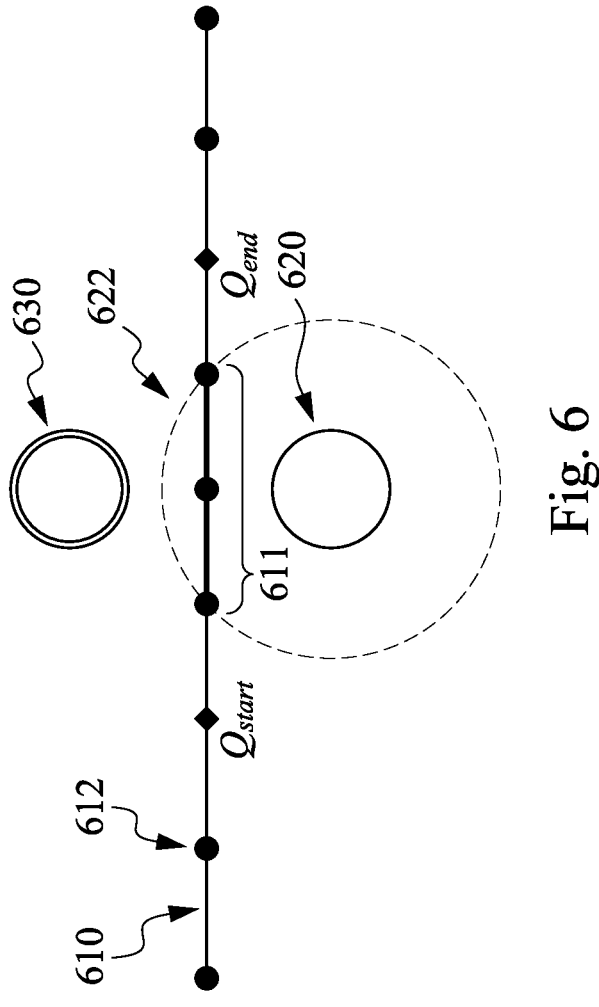
FIG. 6 depicts a schematic diagram of detecting nodes on a dangerous partial path according to one embodiment of the present disclosure.

A description is provided with reference to FIG. 1 and FIG. 6. FIG. 6 depicts a schematic diagram of detecting nodes on a dangerous partial path according to one embodiment of the present disclosure. When being used, the offline original path planning module 122 first sets a position, a size, and an orientation of a known static obstacle 630 in the three-dimensional environment, and then plans a static original path 610 that dodges the static obstacle 630 based on a task of the robot arm. As a result, the robot arm 130 travels along each of nodes 612 on the static original path 610. The online obstacle tracking module 121 obtains states of obstacles (such as the static obstacle 630, a dynamic obstacle 620, etc.) in real time. The dangerous partial path detection unit 124 detects a dangerous partial path 611 where the collision danger occurs. The partial path re-planning unit 125 re-plans the partial path of the robot arm 130 based on the hybrid RRT. The path switching module 126 uses a relative distance between the obstacle and the robot arm 130 to determine whether the robot arm 130 should execute the static original path or the partial path to avoid collision with the obstacle in all directions. The action planning module 127 allows the robot arm 130 to perform an action correspondingly. For example, the robot arm 130 includes a robot arm controller 131, and the action planning module 127 allows the robot arm controller 131 to perform the corresponding action. However, the present disclosure is not limited in this regard.

Figure 2:
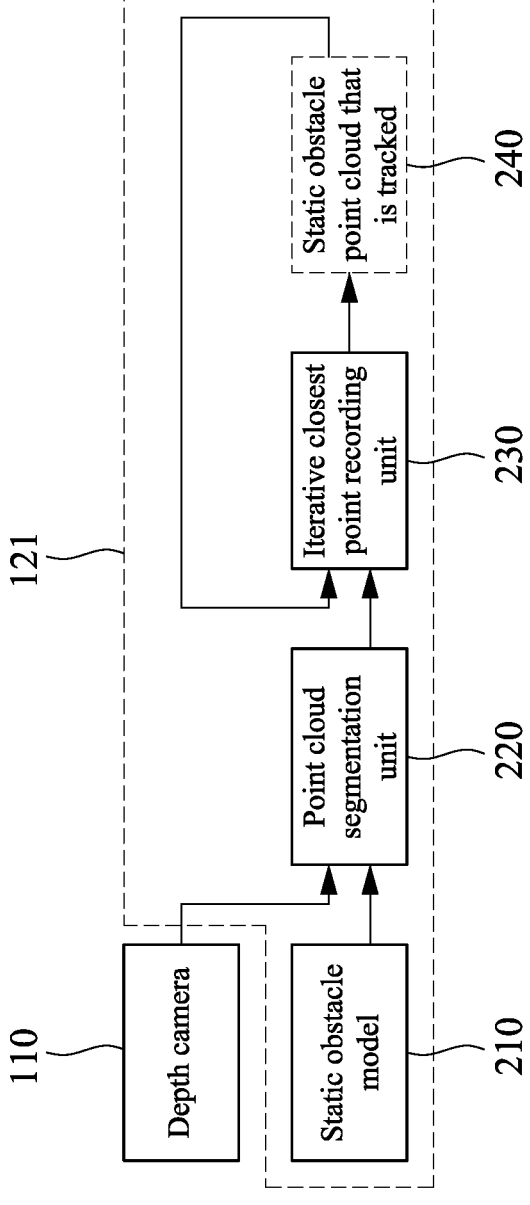
FIG. 2 depicts a structure diagram of an online obstacle tracking module according to one embodiment of the present disclosure.

In order to further illustrate the static obstacle tracking of the above online obstacle tracking module 121, a description is provided with reference to FIG. 2. FIG. 2 depicts a structure diagram of the online obstacle tracking module 121 according to one embodiment of the present disclosure. As shown in FIG. 2, the online obstacle tracking module 121 includes a static obstacle model 210, a point cloud segmentation unit 220, and an iterative closest point (ICP) recording unit 230.

When being used, the point cloud segmentation unit 220 uses the static obstacle model 210 and an environment point cloud provided by the depth camera 110 to initially obtain a point cloud of the static obstacle. The ICP recording unit 230 then uses the ICP method to track and update the point cloud of the static obstacle. In addition to that, when a static obstacle point cloud 240 that is latest tracked reflects that the point cloud of the static obstacle is covered, tracking data at the last moment is stored through the ICP recording unit 230 to be used as the point cloud of the static obstacle.

Figure 3:
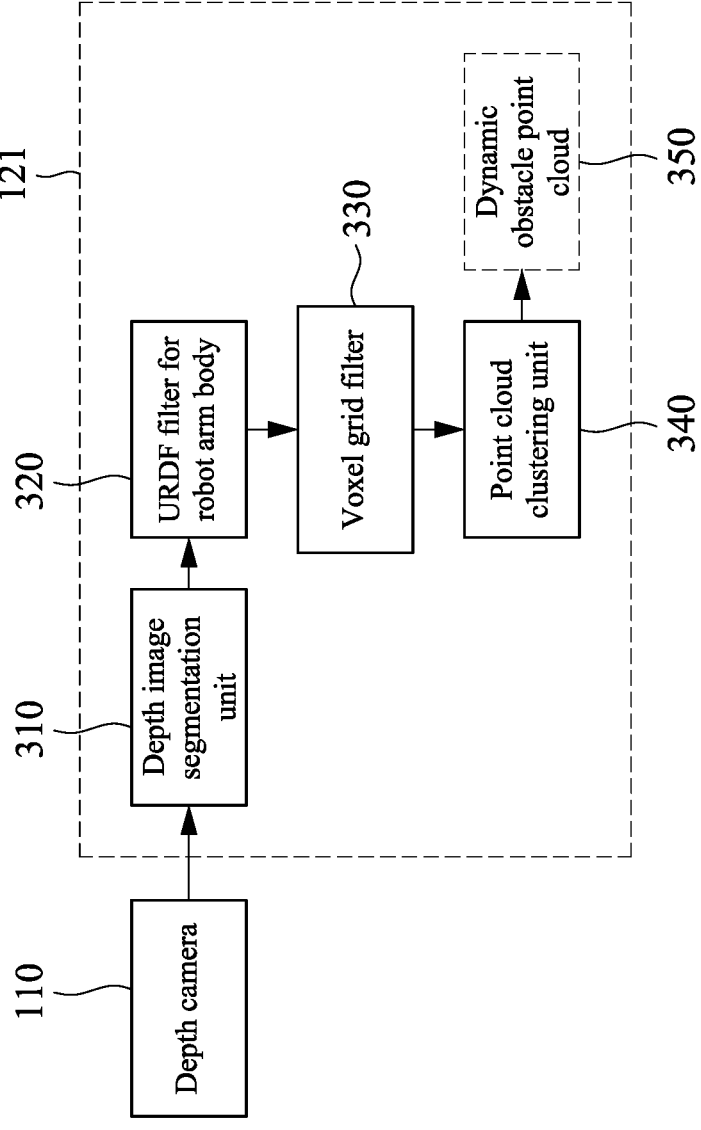
FIG. 3 depicts a structure diagram of an online obstacle tracking module according to another embodiment of the present disclosure.

In order to further illustrate the dynamic obstacle tracking of the above online obstacle tracking module 121, a description is provided with reference to FIG. 3. FIG. 3 depicts a structure diagram of the online obstacle tracking module 121 according to another embodiment of the present disclosure. As shown in FIG. 3, the online obstacle tracking module 121 includes a depth image segmentation unit 310, a Unified Robot Description Format (URDF) filter for robot arm body 320, a voxel grid filter 330, and a point cloud clustering unit 340.

When being used, multiple background depth images of the environment, which include the static obstacle, are first stored during an offline stage, and the multiple depth images are averaged through a median filter to obtain a background depth image with less noises. When the robot arm is online to execute the task, the depth image segmentation unit 310 subtracts the stored background image from an online real-time depth image to obtain a depth image of the dynamic object in the environment at this time. The URDF filter for robot arm body 320 filters an image of the robot arm body to obtain a filtered depth image. The voxel grid filter 330 reduces a dimensionality of a point cloud of the above filtered depth image. The point cloud clustering unit 340 clusters the point cloud to obtain a dynamic obstacle point cloud 350.

Figure 4:
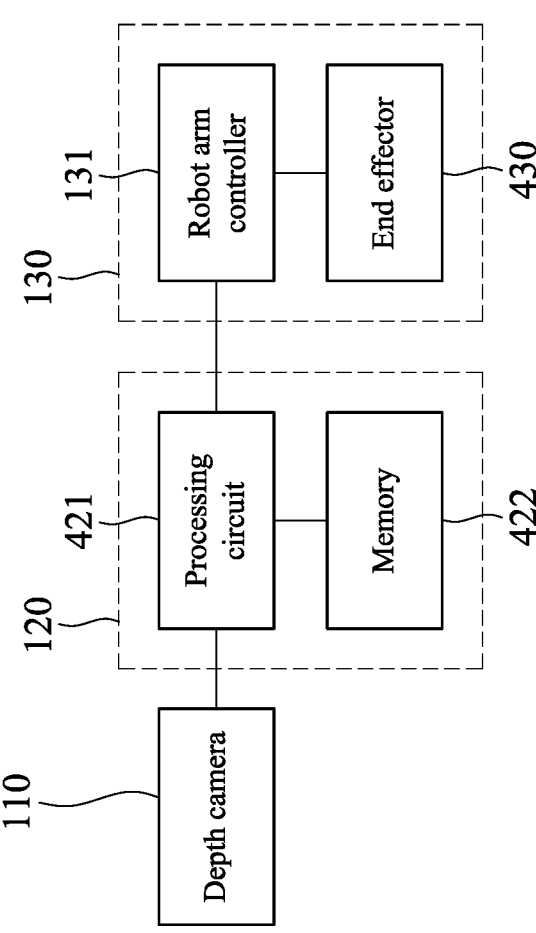
FIG. 4 depicts a functional block diagram of a system for path planning of a robot arm in a dynamic environment according to another embodiment of the present disclosure.

In order to further illustrate the hardware structure of the above system 100, a description is provided with reference to FIG. 4. FIG. 4 depicts a functional block diagram of a system 400 for path planning of a robot arm in a dynamic environment according to another embodiment of the present disclosure. As shown in FIG. 4, the processing device 120 includes a processing circuit 421 and a memory 422. As for the structure, the processing circuit 421 is electrically connected to the memory 422. For example, the processing circuit 421 may be a processor. The memory 422 may be a memory circuit, a storage circuit and/or a similar circuit.

In practical implementation, in some embodiments of the present disclosure, the modules and their units shown in FIG. 1 to FIG. 3 may be implemented as program instructions stored in the memory 422. The processing circuit 421 executes the above instructions to achieve the functions correspondingly.

In FIG. 4, the robot arm 130 includes the robot arm controller 131 and an end effector 430. As for the structure, the robot arm controller 131 is connected to the end effector 430.

Figure 5:
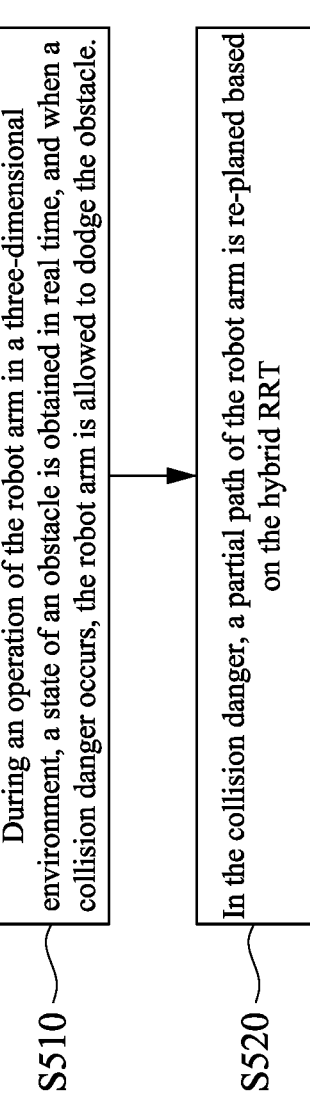
FIG. 5 depicts a flowchart of a method for path planning of a robot arm in a dynamic environment according to one embodiment of the present disclosure.

In order to further illustrate the operation method of the above system 100 and system 400, a description is provided with reference to FIG. 1 to FIG. 5. FIG. 5 depicts a flowchart of a method 500 for path planning of a robot arm in a dynamic environment according to one embodiment of the present disclosure. As shown in FIG. 5, the method 500 includes step S510, S520 (it should be understood that the order of the steps described in this embodiment, unless otherwise specified, can be adjusted depending on practical needs, and the steps can even be performed simultaneously or partially performed simultaneously).

The method 500 can adopt the form of a computer program product on a non-transitory computer-readable recording medium. The computer-readable recording medium has a plurality of computer-readable instructions in the medium. A suitable recording medium may include any one of the following: a non-volatile memory, such as a read-only memory (ROM), a programmable read-only memory (PROM), an erasable programmable read-only memory (EPROM), an electrically erasable programmable read-only memory (EEPROM); a volatile memory, such as: a static random access memory (SRAM), a dynamic random access memory (DRAM), a double data rate random access memory (DDR-RAM); an optical storage device, such as a CD-ROM, a DVD-ROM; a magnetic storage device, such as a hard disk drive, floppy disk drive.

In step S510, during an operation of the robot arm in a three-dimensional environment, a state of an obstacle is obtained in real time, and when a collision danger occurs, the robot arm is allowed to dodge the obstacle. In step S520, in the collision danger, a partial path of the robot arm is re-planed based on the hybrid RRT.

As for the static obstacle tracking in step S510, a description is provided with reference to FIG. 2, FIG. 5, and FIG. 6. In one embodiment of the present disclosure, the obstacle includes the static obstacle 630. Step S510 includes: using a static obstacle model and an environment point cloud to initially obtain a point cloud of the static obstacle, then using an ICP method to track and update the point cloud of the static obstacle, and storing tracking data at the last moment through the ICP method to be used as the point cloud of the static obstacle when the point cloud of the static obstacle is covered.

In greater detail, in step S510, in order to segment a static obstacle point cloud cluster from the environment point cloud, it may be necessary to utilize a voxel static obstacle description established during the offline stage and use a pass through filter. The pass through filter can retain the point cloud within a specific range of a three-dimensional space to form correct inliers by inputting upper and lower limits of the xyz three axes, and remove the point cloud of the other part. A position of each of points in the static obstacle point cloud that is obtained after being filtered is represented by [x, y, z], and satisfies the following interval:

$$x \in [p_x - 0.51 - \varepsilon, \ p_x + 0.51 + \varepsilon] \tag{1}$$

$$y \in [p_y - 0.5w - \varepsilon, \ p_y + 0.5w + \varepsilon] \tag{2}$$

$$z \in [p_z - 0.5h - \varepsilon, \ p_z + 0.5h + \varepsilon] \tag{3}$$

Here Px, Py, and Pz are center positions of the static obstacle established during the offline stage, l, w, and h are a length, width, and height of the static obstacle voxel, and E is a reserved point cloud segmentation margin. When a position of the static obstacle is slightly deviated from the model, the point cloud can be completely segmented. Through the above method, the static obstacle point cloud can be initially segmented from the environment point cloud.

When the robot arm is moving online, if only the static obstacle point cloud segmented by the pass through filter is relied on to be used as static obstacle information, point cloud information will be lost because the point cloud exceeds the range of the pass through filter when the position of the static obstacle changes or is covered, which in turn causes that the subsequent path re-planning method cannot take the static obstacle information into consideration for collision avoidance. As a result, the present disclosure uses the ICP algorithm to track the static obstacle point cloud cluster. The ICP algorithm is a method used for point cloud superposition. An input point cloud is superimposed on a target point cloud to obtain a transformation relationship between the input point cloud and the target point cloud, and the transformation relationship is a position and a pose of the input point cloud. The present disclosure regards the first static obstacle point cloud obtained by the pass through filter as the input point cloud and the continuously updated environment point cloud as the target point cloud, and continuously uses the ICP method to track and update the pose of the static obstacle point cloud in an iterative manner, as shown in the following formula:

$$P'_{obs} = T_{ICP} P_{obs} \tag{4}$$

Here $P_{obs}$ is the pose of the static obstacle point cloud, its initial guess is a static obstacle model pose established offline, $T_{ICP}$ is a transformation relationship obtained through the ICP method, and $P_{obs}'$ is an updated static obstacle point cloud pose. A static obstacle point cloud pose in the next iteration will use the updated pose for the next round of update. During the tracking process, dynamic obstacles or the robot arm may cover the static obstacle from the camera angle, thus resulting in a poor result of the ICP method. Therefore, an ICP score is checked after each ICP ends. The ICP score represents the superposition degree of the two point clouds in this ICP. When the ICP score rises sharply, it means that the point cloud superposition can not be achieved because the target point cloud is covered. At this time, the ICP method is suspended and the last tracked point cloud pose is stored to be used as the pose of the static obstacle at this time. The ICP tracking will not be continued until the covering situation is over. Through the above method, even if the static obstacle is covered, a complete static obstacle point cloud still can be obtained.

As for the dynamic obstacle tracking in step S510, a description is provided with reference to FIG. 3, FIG. 5, and FIG. 6. In one embodiment of the present disclosure, the obstacle includes the dynamic obstacle 620. Step S510 includes: using a background segmentation method to obtain a dynamic obstacle point cloud, and clustering the dynamic obstacle point cloud to obtain a point cloud cluster of the dynamic obstacle closest to the robot arm, and then using a Kalman filter to stabilize tracking of the point cloud cluster of the dynamic obstacle to obtain a tracking result of the dynamic obstacle.

In greater detail, in step S510, in order to obtain unexpected dynamic object information in real time, it is necessary to remove static objects, such as environment background, static obstacle information, etc., from a depth image. The present disclosure uses the depth image background segmentation method to remove the static environment background and obtain a depth image of a moving object. This method does not need to establish a dynamic obstacle model in advance, and can generate images of dynamic objects based on online data in real time, which is a real-time method with high flexibility. During the offline stage, multiple background depth images of the environment, which include the static obstacle, are first stored, and the multiple depth images are averaged through a median filter to obtain a background depth image with less noises. When the robot arm is online to execute a task, the stored background image is subtracted from an online real-time depth image to obtain a depth image of the dynamic object in the environment at this time.

After the dimensionality of the point cloud is reduced, since only the obstacle entering into a space formed by the robot arm has the danger of colliding with the robot arm, all point cloud beyond a range formed by the robot arm is removed before point cloud is clustered. Then, point cloud clustering is performed. Because each of points in the point cloud is single and independent, it is impossible to know which point cloud cluster each of the points belongs to. In order to classify each of dynamic obstacle point cloud clusters, the present disclosure uses a K-Dimension tree (K-D tree) to cluster each of dynamic obstacle point clouds and calculates the point cloud cluster closest to the robot arm as the dynamic obstacle that most needs to be considered for collision avoidance. The K-D tree is a structure similar to the binary search tree. The difference lies in that the K-D tree can use K keys to perform data splitting. Take three-dimensional point cloud data as an example, the X-axis data splitting is used at the first node, the Y-axis data splitting is used at the second node, and the Z-axis splitting is used at the third axis, and the leaf node is finally reached. After the K-D tree is established, different point cloud clusters can be defined by querying the relationships between nodes and nodes. The K-D tree data structure can ensure that the point cloud data can be classified quickly and in real time when performing large-scale clustering computations, such as the three-dimensional point cloud.

After the K-D tree is established, in addition to classifying different point cloud clusters, it can also be used to search for a shortest distance from a specific point in a space to the point cloud cluster. It is assumed that a shortest distance from one point P(x,y,z) in the space to the point cloud needs to be searched, and a leaf node closest to point P is calculated. This node is temporary set as a closest point. Then a parent node of this leaf node is searched up. If a distance from point P to the parent node is greater than a distance to the leaf node, it means that there is no closer node in a branch above the parent node. At this time, the closest point is the leaf node. If the distance from point P to the parent node is smaller than the distance to the leaf node, it means that there may still be a closer node in the branch above the parent node. At this time, the parent node is temporary set as the closest point and the search is continued until the closest point is found. After the closest point is found, the point cloud cluster closest to the robot arm can be known. This point cloud cluster is the dynamic obstacle that the robot arm most needs to pay attention to at the moment, and this point cloud cluster is tracked. If it is too close to the robot arm, the path needs to be re-planned so that the robot arm can immediately dodge this dynamic obstacle.

Since the dynamic obstacle point cloud is updated in real time, the closest point obtained through the K-D tree is interfered with by noises, which makes a position of the closest point unstable. Therefore, the present disclosure introduces the Kalman filter to stabilize the tracking of the closest point of the dynamic obstacle. The Kalman filter is a high-efficiency recursive filter that is frequently used in engineering, it uses the predicted and estimated value of the dynamic system to update the observation value of the sensor so as to obtain a more stable tracking result, and it also has good effects when being applied to dynamic point cloud tracking.

Before using the Kalman filter to track the closest point of the dynamic obstacle, it is necessary to establish a motion prediction model for a position of the obstacle in advance, as shown in the following formula:

$$
\begin{bmatrix} x_k \\ y_k \\ z_k \\ \dot{x_k} \\ \dot{y_k} \\ \dot{z_k} \end{bmatrix} = \begin{bmatrix} 1 & 0 & 0 & \Delta t & 0 & 0 \\ 0 & 1 & 0 & 0 & \Delta t & 0 \\ 0 & 0 & 1 & 0 & 0 & \Delta t \\ 0 & 0 & 0 & 1 & 0 & 0 \\ 0 & 0 & 0 & 0 & 1 & 0 \\ 0 & 0 & 0 & 0 & 0 & 1 \end{bmatrix} \begin{bmatrix} x_{k-1} \\ y_{k-1} \\ z_{k-1} \\ \dot{x_{k-1}} \\ \dot{y_{k-1}} \\ \dot{z_{k-1}} \end{bmatrix} \tag{5}
$$

Here $[x_k, y_k, z_k]$ is a position of the closest point at time k, $[\dot{x_k}, \dot{y_k}, \dot{z_k}]$ is a speed of the closest point at time k, $[x_{k-1}, y_{k-1}, z_{k-1}]$ is a position of the closest point at time k−1, $[\dot{x_{k-1}}, \dot{y_{k-1}}, \dot{z_{k-1}}]$ is a speed of the closest point at time k−1, and $\Delta t$ is a time change amount. Then, formula (5) is simplified into a symbolic representation:

$$
X_k = A X_{k-1} \tag{6}
$$

A is the transition matrix, and then calculate the process covariance matrix $P_k$:

$$
P_k = A P_{k-1} A^T + Q_k \tag{7}
$$

Here $Q_k$ is the noise covariance matrix, and $P_{k-1}$ is the process covariance matrix at time k−1.

After the motion prediction model of the obstacle is established, information of the observation value is processed next, and the closest point obtained by the K-D tree is utilized, as shown in the following formula:

$$
M_k = \begin{bmatrix} x_k^m & y_k^m & z_k^m & \dot{x}_k^m & \dot{y}_k^m & \dot{z}_k^m \end{bmatrix}^T + N_k \tag{8}
$$

Here $N_k$ is the observed noise, $[x_k{}^m \ y_k{}^m \ z_k{}^m \ \dot{x}_k{}^m \ \dot{y}_k{}^m \ \dot{z}_k{}^m]$ is the observed state vector of the closest point. Then, formula (7) and formula (8) are utilized to calculate the Kalman gain K and update the state vector $X_k$ of the closest point of the obstacle at the same time:

$$
\begin{cases} K = P_k H (H P_k H^T + R)^{-1} \\ \widehat{X_{k'}} = X_k + K[Z - H X_k] \end{cases} \tag{9}
$$

Here R is the observation error matrix, H is the transition matrix, and finally the process covariance matrix $\hat{P}_k$ that is updated at the same time can be obtained:

$$
\hat{P}_k = [I - KH] P_k \tag{10}
$$

Through the continuous updates of the predicted motion state and the obstacle observation state, noise interference can be reduced and a set of more stable dynamic obstacle tracking results can be obtained. These results will be utilized subsequently to determine whether to start the partial path re-planning method or not.

As for the partial path re-planning method in step S520, a description is provided with reference to FIG. 1, FIG. 5, and FIG. 6. In one embodiment of the present disclosure, step S520 includes: establishing a protection area 622 around the dynamic obstacle 620, calculating a relative distance between the static original path 610 of the robot arm 130 and the protection area 622, obtaining the partial path that needs to be re-planned and establishing a start point (start node $Q_{start}$) and an end point (end node $Q_{end}$) of the partial path.

In greater detail, in step S520 when the robot arm 130 is online to execute the task, it will continuously monitor the relative distance between the obstacle and the static original path. When the obstacle is too close to the static original path, it is necessary to start the partial path re-planning to generate a new collision avoidance path. However, before that it is necessary to define the range of the re-planning in advance and find the dangerous partial nodes on the static original path. The present disclosure establishes the protection area 622 on the point cloud of the dynamic obstacle 620 closest to an end point of the robot arm 130, and the protection area 622 is a spheroid with a preset radius. If any node on the static original path 610 enters into the protection area 622, the partial path re-planning method is started and these nodes entering into the protection area 622 are regarded as dangerous path nodes, and a previous node of these dangerous nodes are regarded as the start node $Q_{start}$ of the partial path re-planning and a next node of these dangerous nodes are regarded as the end node $Q_{end}$ of the partial path re-planning, as shown in FIG. 6. In order to reduce the amount of computation, the detection range of this algorithm is from the current motion target node of the robot arm to the end point. As the robot arm 130 gets closer to the end point, the detection range will gradually decrease.

Figure 7:
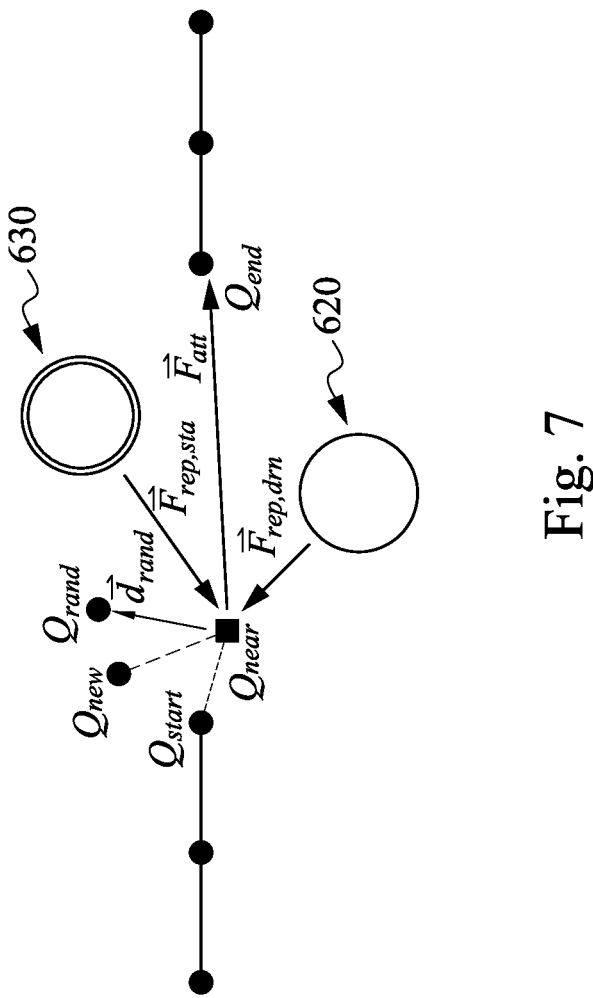
FIG. 7 depicts a schematic diagram of path planning based on a hybrid rapidly-exploration random tree (Hybrid RRT) according to one embodiment of the present disclosure.

A description is provided with reference to FIG. 1, FIG. 5, and FIG. 7. FIG. 7 depicts a schematic diagram of path planning based on a hybrid RRT according to one embodiment of the present disclosure. In one embodiment of the present disclosure, step S520 includes: integrating an artificial potential field (APF) and a rapidly-exploration random tree (RRT) to re-plan the partial path through the hybrid RRT, in which the RRT is affected by the resultant force of APF in the three-dimensional environment so that the extension of the RTT will be guided by the AFT to obtain the local path; dynamically adjusting a weight of the APF and a weight of the RRT based on a volume distribution of the obstacle in the three-dimensional environment so as to optimize the partial path.

In greater detail, in step S520 after obtaining the start point and the end point of the path that needs to be re-planned, the partial path re-planning method can be started. In order to optimize a length of the re-planned path, the new path will not detour to avoid the obstacles. The partial path re-planning method according to the present disclosure uses the hybrid RRT path planning method that mixes two algorithms APF and RRT. By using the APF to guide an extension direction of the RRT search tree, the newly planned path can simultaneously dodge the static and dynamic obstacles and at the same time maintain an optimized path length, so that the newly planned path does not detour to dodge the obstacles. The Hybrid RRT path planning is shown in the FIG. 7.

Here Q represents nodes of the RRT method, and $Q_{rand}$ is a random node that is randomly sampled. When a new node $Q_{new}$ is generated by this iterative search, it will be extended from $Q_{near}$, and the new $Q_{new}$ is added to the search tree to become a candidate for the next round of node $Q_{near}$. $\vec{d}_{rand}$ is a direction vector $\vec{d}$ ($Q_{rand}$, $Q_{near}$) from $Q_{near}$ to $Q_{rand}$, and the direction vector a $\vec{d}$ can be defined by the following formula:

$$\vec{d}(P', P) = [d_x, d_y, d_z]^T \qquad (11)$$

$$\text{where} \begin{cases} d_x = P'_x - P_x \\ d_y = P'_y - P_y \\ d_z = P'_z - P_z \end{cases}$$

Here P is a point in a Cartesian space. In each iterative search, the node $Q_{new}$ newly added to the search tree is composed by adding the random vector $\vec{d}_{rand}$ generated by the RRT method and an APF resultant force vector $\overrightarrow{F_{total}}$, which can be expressed by the following formula:

$$Q_{new} = Q_{near} + \left( \alpha \frac{\vec{d}_{rand}}{|\vec{d}_{rand}|} + \beta \frac{\overrightarrow{F_{total}}}{|\overrightarrow{F_{total}}|} \right) \qquad (12)$$

Here $\alpha$ is the weight of RRT, which is responsible for adjusting a weight of the RRT method, and $\beta$ is the weight of APF, which is responsible for adjusting a weight of the APF method. The APF resultant force vector is constituted by three vectors, which are an attractive force $\overrightarrow{F_{att}}$ from a partial end point, a repulsive force $\overrightarrow{F_{rep,sta}}$ from the static obstacle, and a repulsive force $\overrightarrow{F_{rep,dyn}}$ from a dynamic obstacle, as shown in the following formula:

$$\overrightarrow{F_{total}} = \overrightarrow{F_{att}} + \overrightarrow{F_{rep,sta}} + \overrightarrow{F_{rep,dyn}} \qquad (13)$$

In order to avoid the extreme values caused by the vector magnitudes of APF, the present disclosure designs the APF functions as exponential functions, and the design of the attraction function is shown as follows:

$$\overrightarrow{F_{att}} = V_a\left(1 - e^{-|\vec{d}_{att}|/f_a}\right)\frac{\vec{d}_{att}}{|\vec{d}_{att}|} \qquad (14)$$

Here $V_a$ is a maximum value of the attractive force, $f_a$ is a shaping factor for adjusting the attraction function curve, $\vec{d}_{att}$ is a direction vector $\vec{d}$ ($Q_{end}$, $Q_{near}$) from $Q_{near}$ to $Q_{end}$. When $Q_{near}$ is far away from the end node $Q_{end}$ of the partial path re-planning, the attractive force will increase, so that the RRT search tree extends towards a target point, thus making the search more efficient. The design of the repulsive force function is shown as follows:

$$\overrightarrow{F_{rep}} = \frac{V_r}{\left(1 + e^{f_r\left(|\vec{d}_{rep}|-d_{safe}\right)}\right)} \frac{\vec{d}_{rep}}{|\vec{d}_{rep}|} \qquad (15)$$

Here $V_r$ is a maximum value of the repulsive force, $f_r$ is a shaping factor for adjusting the repulsive force curve, $\vec{d}_{rep}$ is a direction vector $\vec{d}$ ($Q_{near}$, $P_{obs}$) from an obstacle position Pobs to $Q_{near}$, $d_{safe}$ is a minimum safety protection distance. When the position of the obstacle is very close to $Q_{near}$, it means that the obstacle is very close to the search tree. At this time, the repulsive force will increase to allow the search tree to extend away from the obstacle. There are two repulsive forces in formula (13), which comes from the static obstacle and the dynamic obstacle, respectively. These two repulsive forces use the same repulsive force function, and the difference lies in that the positions of $P_{obs}$ come from the static obstacle and the dynamic obstacle, respectively. With the design of the exponential APF functions, no matter what the distances of the direction vectors $d_{att}$, $\vec{d}_{rep}$ are, the magnitudes of the values generated by APF will not exceed set maximum values, which avoids the problem that the quadratic APF function will generate the extreme value. In addition, when the magnitudes of the values generated by APF are close to the maximum values, they will grow in more flat curves, so that the extension direction of the RRT search tree can be better controlled when the partial path is re-planned to increase the probability of path convergence. When the dynamic obstacle has a faster moving speed, the reduction amplitude of the distance between the obstacles and $Q_{near}$ per unit time increases, so that the repulsive force will also increase correspondingly. As a result, the re-planning method is not affected by the increase of the speed of the dynamic obstacle.

In formula (12), $\alpha$ and $\beta$ are the weights of the two planning methods APF and RRT when controlling the partial path re-planning. In a dynamic environment, the vector field of the APF can become complicated because the dynamic obstacle continuously changes its state. At this time, if a ratio of APF to RRT is kept constant, the path re-planning method will have less flexibility, and the re-planning time will increase or the path length will increase. Hence, the influence of APF should be appropriately increased or decreased based on the description of obstacles in the current environment when re-planning. When there are more obstacles around $Q_{near}$, the direction pointed by the APF resultant force vector will make it difficult for the RRT search tree to converge, which increases the re-planning time. Therefore, under this circumstance, the influence of RRT should be increased to allow the search tree to be more likely to be out of the area with more obstacles. Additionally, the influence of APF should be decreased, so that the search tree is not constrained by the APF and extend towards the direction that is difficult to converge. When there are less obstacles around $Q_{near}$, the direction pointed by the APF resultant force vector can make the search tree converge quickly. Therefore, under this circumstance, the influence of RRT should be decreased, so that the search tree can extend in a more optimal path direction. In addition to that, the influence of APF should be increased, so that the search tree can quickly extend to the end point to complete the re-planning.

In order to further realize the design for dynamically adjusting the APF and RRT weights, in formula (12), the present disclosure designs the RRT weight and the APF weight to dynamically adjust the weight ratio of these two path planning algorithms when re-planning. The hybrid weight of the two methods APF and RRT will be dynamically adjusted due to the obstacle description of the area where the RRT search tree is located. In the area where there are more obstacles around $Q_{near}$, the RRT weight is increased and the APF weight is decreased, so that the search tree is more likely to be out of the area with complex obstacles. In addition, in the area with less obstacles, the RRT weight is decreased and the APF weight is increased, so that the search tree of re-planning can quickly converge and a more optimal path length is obtained. In order to achieve the above adjustment effect, the present disclosure establishes the spheroid search area S around $Q_{near}$, and defines the method for adjusting the RRT weight as follows:

$$\alpha \triangleq \frac{S \cap V_{obs}}{S} \qquad (16)$$

Here $V_{obs}$ is a volume description of the static and dynamic obstacles in the environment. Formula (16) indicates that when there are more obstacles in the search area around $Q_{near}$, the RRT weight will increase, otherwise it will decrease. However, since the static and dynamic obstacles of the system of the present disclosure are described as point clouds, which do not contain the physical meaning of volume. In order to further realize formula (16), the present disclosure uses a grid side length set by a voxel filter to approximate and restore the volume of the point cloud object, as shown in the following formula:

$$\begin{cases} \alpha & = \dfrac{nl^3}{\frac{4}{3}\pi R^3} \\ \beta & = 1 - \alpha \end{cases} \qquad (17)$$

Here n is the number of points of the point cloud entering into the search area, l is the grid side length of the voxel filter, and R is a radius of the spheroid of the search area. In formula (17) the denominator of the a term is the volume of the spheroid search area, and the numerator is the volume of obstacle entering into the search area. Since the original point cloud density before passing through the voxel filter is high enough, the volume of obstacle entering into the search area can be approximated and restored through a grid volume of the voxel filter.

A description is provided with reference to FIG. 4, FIG. 5, and FIG. 6. In one embodiment of the present disclosure, the above method 500 further includes: using a relative distance between the obstacle and the end effector 430 of the robot arm 430 to determine whether the robot arm 130 should execute the static original path 610 or the partial path to avoid collision with the obstacle in all directions.

In greater detail, the collision avoidance path planning system in all directions provided by the present disclosure uses the static original path of the robot arm for partial path re-planning. After the robot arm dodges the dynamic obstacle or the dynamic obstacle moves away from the robot art, the robot arm needs to return to the static original path to continue executing the task, in this manner the task can be completed with a more efficient operation path. The present disclosure provides a path switching determination method to determine whether the robot arm should execute the static original path or the re-planned path at the moment, which is represented by the following formula:

$$\begin{cases} \text{Execute new path,} & |\vec{d}(P_{obs}, P_{tcp})| < \rho r \\ \text{Execute static initial path,} & |\vec{d}(P_{obs}, P_{tcp})| \geq \rho r \end{cases} \qquad (18)$$

Here $P_{tcp}$ is a position of the end effector of the robot arm in the Cartesian space, r is the radius of the protection area 622, and p is a parameter for adjusting a determined distance. When the distance between the end effector 430 of the robot arm 130 and the dynamic obstacle 620 is smaller than p times the radius of protection area 622 and at this time there is a re-planned path, it means that the robot arm 130 may collide with the dynamic obstacle 620. The robot arm 130 will execute the re-planned path to dodge the static obstacle 630 and the dynamic obstacle 620. When the distance between the end effector 430 of the robot arm 130 and the dynamic obstacle 620 is greater than p times the radius of protection area 622, it means that the robot arm 130 has dodged the dynamic obstacle 620 or the dynamic obstacle 620 has left, and the robot arm 130 will return to the static original path 610 to dodge the static obstacle 630 and continue to advance towards the target point of the task. When the robot arm 130 dodges the dynamic obstacle 620 and returns to the static original path 610, if another unexpected dynamic obstacle approaches the re-planned path again, the path re-planning method will be started again at this time and the re-planned path that is previously planned is modified to generate an updated dodging path.

Additionally, since at this time the condition of formula (18) is satisfied, the robot arm 130 will execute the newest dodging path in all directions to dodge the second unexpected dynamic obstacle and the static obstacle. Only after the second dodge is completed, will the robot arm continue to return to the static original path to execute the task.

Figure 8:
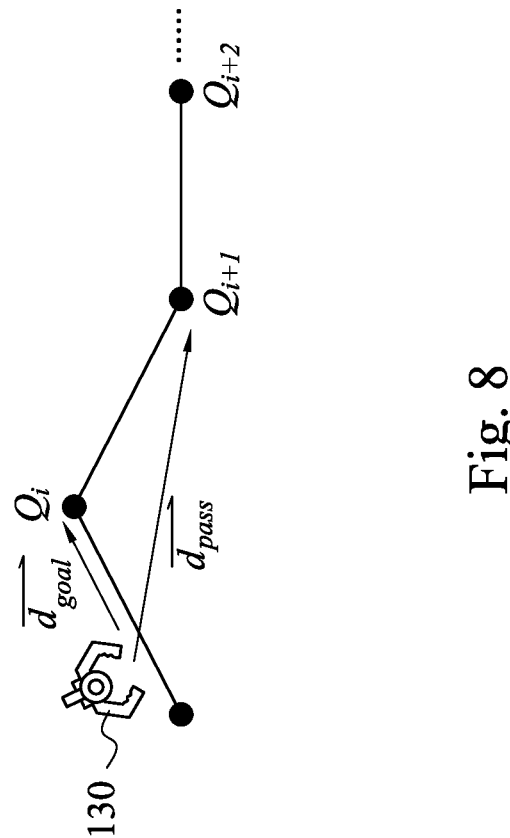
FIG. 8 depicts a schematic diagram of a motion speed control of a robot arm according to one embodiment of the present disclosure.

A description is provided with reference to FIG. 4, FIG. 5, and FIG. 8. FIG. 8 depicts a schematic diagram of a motion speed control of the robot arm 130 according to one embodiment of the present disclosure. In one embodiment of the present disclosure, the above method 500 further includes: making the end effector 430 of the robot arm 130 have a smooth speed when passing through a node on a path, then calculating the joint speeds of the robot arm 130; limiting the joint speeds of the robot arm 130 when approaching a singular point to avoid the singular point, and using other free axes to compensate for a speed so that the robot arm is allowed to continue moving on the path.

In greater detail, both the static original path 610 and the re-planned path are composed of a series of nodes in the Cartesian space. In order to allow the end effector 430 of the robot arm 130 to move along these nodes, it is necessary to design a method of controlling the motion of the robot arm. The motion speed of the robot arm in the Cartesian space is first planned, and then transform it into the joint speeds in a joint space. If the point-to-point motion mode of the traditional robot arm is used, the speed of the end effector of the robot arm will drop to 0 when passing through each of the nodes, thus resulting in a decrease in the overall motion efficiency of the robot arm. This is disadvantageous to practical applications. The motion speed planning of the end effector of the robot arm 130 in the Cartesian space provided by the present disclosure is shown as follows:

$$\dot{X} = V_{max}\left(1 - e^{-\overrightarrow{|d_{goal}|}*\mu}\right)\frac{\overrightarrow{d_{goal}}}{|\overrightarrow{d_{goal}}|} + V_{max}e^{-\overrightarrow{|d_{goal}|}*\mu} * \frac{\overrightarrow{d_{pass}}}{|\overrightarrow{d_{pass}}|} \qquad (19)$$

Here $\dot{X}$ is the speed of the end effector of the robot arm in the Cartesian space $[\dot{x}, \dot{y}, \dot{z}]$, $V_{max}$ is a maximum motion speed of the robot arm, $\overrightarrow{d_{goal}}$ is a direction vector $\vec{d}$ ($Q_i$, $P_{tcp}$) from the end point $P_{tcp}$ of the robot arm to a current motion target node $Q_i$ of the robot arm, $d_{pass}$ is a direction vector $\vec{d}$ ($Q_{i+1}$, $P_{tcp}$) from the end point $P_{tcp}$ of the robot arm to a next node $Q_{i+1}$ of the current motion target node $Q_i$ of the robot arm, and p is a parameter for controlling the acceleration and deceleration of the robot arm. The vector relationships are shown in FIG. 8.

In formula (19), the $\overrightarrow{d_{goal}}$ term is responsible for generating the motion speed for moving the robot arm to the current target node. When the robot arm 130 is closer to the motion target node $Q_i$, the speed generated by the $\overrightarrow{d_{goal}}$ term will be smaller. The $\overrightarrow{d_{pass}}$ term is responsible for smoothing the motion speed of the robot arm. When the robot arm 130 is closer to the target node $Q_i$, the speed generated by the $\overrightarrow{d_{pass}}$ term is greater. When the robot arm 130 reaches the motion target node $Q_i$, the speed generated by the $\overrightarrow{d_{goal}}$ term at this time is zero, and the speed generated by $\overrightarrow{d_{pass}}$ can make the robot arm move forward to the next target node immediately. In formula (19) the three-dimensional motion speed of the robot arm in the Cartesian space is planned, so the six-axis motion speed of the robot arm 130 needs to be obtained through the Inverse Jacobian transformation of the robot arm at the moment, as shown in the following formula:

$$\dot{q} = J^{\#}\dot{X} \qquad (20)$$

Here $\dot{q}$ is the n×1 motion speed vector of the robot arm, J is the m×n Jacobian matrix of the robot arm, and $J^{\#}$is the pseudo inverse matrix of the Jacobian matrix of the robot arm. If the robot arm is close to the singular point during motion, then the motion control method provided herein will be used at this time to limit the axis close to the singular point. A constrained speed X, in the Cartesian space is generated correspondingly, and the joint that is about to fall into the singular point is set as a constrained joint. After that, the constrained speed $\dot{X}_v$ can be transformed into a constrained joint speed through partial Jacobian:

$$\dot{q}_v = J_v^{\#}\dot{X}_v, J_v = (J_c|O) \qquad (21)$$

Here, $J_c$ is the partial Jacobian matrix generated by the constrained joint. In order to make its dimensionality to be the same as that of the robot arm axis, a zero matrix is added after the $J_c$ matrix to form the $J_v$ matrix. With the constrained joint speed, the compensated Cartesian space speed can be calculated as follows:

$$\dot{X}' = \dot{X} - J(I - W)\dot{q}_v = (JW)\dot{q}_c \qquad (22)$$

Here I is an identity matrix, W is a diagonal matrix, and the elements on its main diagonal are 0 or 1. If the element on the main diagonal is 0, it means that the corresponding robot arm joint is a compensation joint, and if the element on the main diagonal is 1, it means that this joint is a constrained joint. Then, a compensation speed of the axis is calculated correspondingly:

$$\dot{q}_c = (JW)^{\#}\dot{X}' \qquad (23)$$

Finally, the control speed of the axis is obtained as:

$$\dot{q}' = \dot{q}_c + \dot{q}_v \qquad (24)$$

Through this control mode, when the robot arm 130 is close to the singular point, the joint of the robot arm 130 close to the singular point is constrained, and the other joints are utilized to compensate for the moving speed of the end point of the robot. In this manner, the robot can continue moving along the path nodes while avoiding the singular point. Finally, the motion speed of the axis of the robot arm 130 is sent to an electric control box, so that the end effector 430 of the robot arm 130 can be allowed to move along the nodes on the path, and has a smooth speed when passing the nodes.

In summary, the technical solution of the present disclosure has obvious advantages and beneficial effects as compared with the related art. By using the method 500 and system 100 for path planning of the robot arm in the dynamic environment according to the present disclosure, the dangerous sections in the task path of the robot arm 130 are rapidly identify, and a collision avoidance path in all directions to dodge the static and dynamic obstacles is re-planned by using the obstacle information. The problem that the collision avoidance path planning can only dodge the static obstacle 630 or the dynamic obstacle 620 is resolved. In addition to that, when re-planning the path, the present disclosure will dynamically adjust the characteristics of collision avoidance path planning based on the distribution of the current environment obstacles, thus improving the speed of collision avoidance planning in all directions and optimizing the length of the collision avoidance path in all directions. As a result, the robot arm 130 can not only dodge the obstacles more immediately, but also dodge the obstacles with a more optimal path, which improves the working efficiency of the robot arm. As compared with the collision avoidance path planning in the related art, it has better abilities for planning the speed and optimizing the path.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims and their equivalents.

What is claimed is:

1. A method for path planning of a robot arm in a dynamic environment comprising steps of:

obtaining a state of an obstacle in real time during an operation of the robot arm in a three-dimensional environment, and allowing the robot arm to dodge the obstacle when a collision danger occurs; and re-planning a partial path of the robot arm based on a hybrid rapidly-exploration random tree (Hybrid RRT) in the collision danger, wherein the step of re-planning the partial path of the robot arm based on the hybrid RRT comprises:

integrating an artificial potential field (APF) and a rapidly-exploration random tree (RRT) through the hybrid RRT to re-plan the partial path; and dynamically adjusting a weight of the APF and a weight of the RRT based on a volume distribution of the obstacle in the three-dimensional environment so as to optimize the partial path.

2. The method of claim 1, wherein the obstacle comprises a static obstacle, the step of obtaining the state of the obstacle in real time comprises:

using a static obstacle model and an environment point cloud to initially obtain a point cloud of the static obstacle, then using an iterative closest point (ICP) method to track and update the point cloud of the static obstacle, and when the point cloud of the static obstacle is covered, storing tracking data at a last moment through the ICP method to be used as the point cloud of the static obstacle, wherein the last moment is defined as a time point corresponding to a last successful tracking of the point cloud of the static obstacle by the ICP method before the point cloud of the static obstacle is covered.

3. The method of claim 1, wherein the obstacle comprises a dynamic obstacle, the step of obtaining the state of the obstacle in real time comprises:

using a background segmentation method to obtain a dynamic obstacle point cloud, and clustering the dynamic obstacle point cloud to obtain a point cloud cluster of the dynamic obstacle closest to the robot arm, and then using a Kalman filter to stabilize tracking of the point cloud cluster of the dynamic obstacle to obtain a tracking result of the dynamic obstacle.

4. The method of claim 3, wherein the step of re-planning the partial path comprises:

establishing a protection area around the dynamic obstacle, calculating a relative distance between a static original path of the robot arm and the protection area, obtaining the partial path that needs to be re-planned and establishing a start point and an end point of the partial path.

5. The method of claim 1, further comprising:

using a relative distance between the obstacle and an end effector of the robot arm to determine whether the robot arm executes a static original path or the partial path to avoid collision with the obstacle in all directions.

6. The method of claim 1, further comprising:

making an end effector of the robot arm have a smooth speed when passing through a node on a path, then calculating an axial speed of motion of the robot arm; limiting the axial speed of the robot arm when approaching a singular point to avoid the singular point, and using other free axes to compensate for a speed so that the robot arm is allowed to continue moving on the path.

7. A system for path planning of a robot arm in a dynamic environment, the system comprising:

a depth camera obtaining image data of the robot arm during an operation in a three-dimensional environment; and a processing device electrically connected to the depth camera and the robot arm, the processing device obtaining a state of an obstacle in real time based on the image data, and the processing device allowing the robot arm to dodge the obstacle when a collision danger occurs, and the processing device re-planning a partial path of the robot arm based on a hybrid rapidly-exploration random tree (Hybrid RRT), wherein the hybrid RRT integrates an artificial potential field (APF) and a rapidly-exploration random tree (RRT), the processing device dynamically adjusts a weight of the APF and a weight of the RRT based on a volume distribution of the obstacle in the three-dimensional environment so as to optimize the partial path.

8. The system of claim 7, wherein the robot arm has an end effector, the processing device uses a relative distance between the obstacle and the end effector of the robot arm to determine whether the robot arm executes a static original path or the partial path to avoid collision with the obstacle in all directions.

9. A non-transitory computer readable medium to store a plurality of instructions for commanding a computer to execute a method for path planning of a robot arm in a dynamic environment, and the method comprising steps of:

obtaining a state of an obstacle in real time during an operation of the robot arm in a three-dimensional environment, and allowing the robot arm to dodge the obstacle when a collision danger occurs; and re-planning a partial path of the robot arm based on a hybrid rapidly-exploration random tree (Hybrid RRT) in the collision danger, wherein the step of re-planning the partial path of the robot arm based on the hybrid RRT comprises:

integrating an artificial potential field (APF) and a rapidly-exploration random tree (RRT) through the hybrid RRT to re-plan the partial path; and dynamically adjusting a weight of the APF and a weight of the RRT based on a volume distribution of the obstacle in the three-dimensional environment so as to optimize the partial path.

10. The non-transitory computer readable medium of claim 9, wherein the obstacle comprises a static obstacle, the step of obtaining the state of the obstacle in real time comprises:

using a static obstacle model and an environment point cloud to initially obtain a point cloud of the static obstacle, then using an iterative closest point (ICP) method to track and update the point cloud of the static obstacle, and when the point cloud of the static obstacle is covered, storing tracking data at a last moment through the ICP method to be used as the point cloud of the static obstacle, wherein the last moment is defined as a time point corresponding to a last successful tracking of the point cloud of the static obstacle by the ICP method before the point cloud of the static obstacle is covered.

11. The non-transitory computer readable medium of claim 9, wherein the obstacle comprises a dynamic obstacle, the step of obtaining the state of the obstacle in real time comprises:

using a background segmentation method to obtain a dynamic obstacle point cloud, and clustering the dynamic obstacle point cloud to obtain a point cloud cluster of the dynamic obstacle closest to the robot arm, and then using a Kalman filter to stabilize tracking of the point cloud cluster of the dynamic obstacle to obtain a tracking result of the dynamic obstacle.

12. The non-transitory computer readable medium of claim 11, wherein the step of re-planning the partial path comprises:

establishing a protection area around the dynamic obstacle, calculating a relative distance between a static original path of the robot arm and the protection area, obtaining the partial path that needs to be re-planned and establishing a start point and an end point of the partial path.

13. The non-transitory computer readable medium of claim 9, wherein the method further comprises:

using a relative distance between the obstacle and an end effector of the robot arm to determine whether the robot arm executes a static original path or the partial path to avoid collision with the obstacle in all directions.

14. The non-transitory computer readable medium of claim 9, wherein the method further comprises:

making an end effector of the robot arm have a smooth speed when passing through a node on a path, then calculating an axial speed of motion of the robot arm; limiting the axial speed of the robot arm when approaching a singular point to avoid the singular point, and using other free axes to compensate for a speed so that the robot arm is allowed to continue moving on the path.

* * * * *